United States Patent [19]

Hejazi

[11] Patent Number: 5,554,850
[45] Date of Patent: Sep. 10, 1996

[54] X-RAY SCINTILLATING PLATE UTILIZING ANGLED FIBER OPTIC RODS

[75] Inventor: Shahram Hejazi, Webster, N.Y.

[73] Assignee: Eastman Kodak Company, Rochester, N.Y.

[21] Appl. No.: 334,286

[22] Filed: Nov. 4, 1994

[51] Int. Cl.$^6$ ................................................. G01T 1/20
[52] U.S. Cl. .................. 250/367; 250/368; 250/370.09; 250/370.11
[58] Field of Search .................... 250/367, 368, 250/370.09, 370.11

[56] References Cited

U.S. PATENT DOCUMENTS

| | | | |
|---|---|---|---|
| 4,247,165 | 1/1981 | Versluis | 350/96.27 |
| 4,586,781 | 5/1986 | Gunther et al. | 350/3.7 |
| 4,593,400 | 6/1986 | Mouyen | 378/99 |
| 4,910,405 | 3/1990 | Suzuki et al. | 250/368 |
| 4,914,349 | 4/1990 | Satsui et al. | 313/524 |
| 5,150,394 | 9/1992 | Karellas | 250/370.09 |
| 5,308,986 | 5/1994 | Walker | 250/370.11 |

*Primary Examiner*—Constantine Hannaher
*Assistant Examiner*—Virgil Orlando Tyler
*Attorney, Agent, or Firm*—William F. Noval

[57] ABSTRACT

A direct digital x-ray imaging system includes a fiber optic scintillating plate in which aliasing and x-ray transmission problems are minimized.

3 Claims, 2 Drawing Sheets

X-RAY SCINTILLATING PLATE UTILIZING ANGLED FIBER OPTIC RODS

FIELD OF INVENTION

This invention relates in general to x-ray imaging systems and relates more particularly to direct digital x-ray imaging system including a fiber optic scintillating plate in which aliasing and x-ray transmission problems are minimized.

DESCRIPTION OF THE PRIOR ART

Screen film x-ray diagnostic imaging is an effective tool for detection and diagnosis of a number of diseases, such as cancer, as well as for assessment of injuries. It is widely believed that improved performance with respect to both image quality and radiation dose could be obtained if x-ray image data were acquired directly in digital form. Such a technology would in turn require fewer moving parts (prone to wear and tear), a smaller package, and less image acquisition and processing time.

One of the approaches in direct digital x-ray imaging involves the utilization of a scintillating screen that is then imaged by a CCD (charge coupled device) through a lens or a fiber optic light guide. Some of the requirements for such a screen are high x-ray absorption, high x-ray energy to light photon conversion efficiency, high resolution, large dynamic range. Such screens should also be free of spatial artifacts and easily manufacturable.

Fiber optic scintillating plates seem to have the advantage of having much higher resolution (5 to 15 lp/mm). These fiber optic scintillating plates are made of monolithic bundles of round or hexagonally shaped glass or plastic rods. The rods are oriented at a normal angle with respect to an x-ray image plane. (See FIG. 1, rods 10 are normal to the X-Y plane and parallel to the Z axis.) The rods are doped with some type of rare earth element, such as terbium, to emit visible light when exposed to x-rays. Each rod has its own cladding which is essential in minimizing cross-talk between fibers. The fill-factor in these plates can approach 85% with the remaining 15% attributed to the cladding and light absorbing material used in between the rods. Therefor the produced visible light as a result of x-ray absorption within each fiber core will be channeled and directed toward the imaging sensor, such as a CCD. To capture more of this light, one side of the plate is usually coated with a reflective material, such as aluminum.

Such a scintillating fiber optic plate may also be used in conjunction with other type of sensors such as thin-film transistor (TFT) array or tiled CCD arrays whereby the scintillator may be in direct contact with the array.

Two problems of such a fiber optic scintillating plate are MTF (modulation transfer function) problems and x-ray transmission through the cladding.

MTF (Aliasing) Problems:

The fiber optic scintillating plates can produce images with very high resolution due to the discrete and channelized nature of the emission of light within the core of each fiber. The MTF of a system is defined as the Fourier transform of the system point-spread function (PSF). This means that, in theory, it is possible to measure the MTF by generating the Fourier transform of the image of a point source. The mathematical assumption that is implicit here is that the system is both linear and shift-invariant, i.e., that the location of this point source on the image plan can be chosen arbitrarily. This assumption is invalid in an imaging system in which the image plane is composed of well defined discrete image sensors.

The practical implications of such a problem may cause aliasing in the acquired image at various spatial frequencies. This effect may be most evident when imaging an object with spatial frequencies at exact multiples of the pixel pitch.

One way to overcome this problem is to blur the image at the detector level so that the boundaries of the pixels are not as well defined and then to edge enhance the acquired image using image processing techniques. This is often done in CCD based systems.

X-Ray Transmission Problem:

Although the absorption of x-rays of the core in the scintillating fiber optic plates is close to 100%, this is not the case for the cladding. Any x-ray photons transmitted through the cladding and striking the detector may cause image blurring and at the same time reduce the lifetime of the detector significantly. This is significant in CCDs when a single x-ray photon may generate so many electrons as to saturate the well and causes unacceptable image blurring.

U.S. Pat. No. 4,910,405, issued Mar. 20, 1990, inventors Suzuki et al., discloses an x-ray image sensor including a fiber optic face plate, a phosphor screen formed on the x-ray incidence side of the face plate and an image sensing device connected to the other side of the face plate. A core material of the face plate is a radiation shielding glass which prevents x-ray damage of the solid-state image sensing device. The face plate can be inclined from the normal axis to the screen. There is no disclosure in this patent of a fiber optic scintillating plate which is angled to the normal axis of an x-ray image.

U.S. Pat. No. 4,247,165, issued Jan. 27, 1981, inventor Versluis; U.S. Pat. No. 4,586,781, issued May 6, 1986, inventor Gunther et al.; and U.S. Pat. No. 4,914,349, issued Apr. 3, 1990, inventors Matsui et al. disclose fiber optic plates having fibers which are inclined at an angle to an optical plane. The fiber optic plates disclosed in these patents purport to solve various optical transmission problems, but are not directed to such problems as prevention of x-ray transmission to an image sensing device.

SUMMARY OF THE INVENTION

According to the present invention, there is provided a solution to the problems of the prior art relating to fiber optic scintillating plates. According to a feature of the present invention, a fiber optic scintillating plate is provided which has fibers which are tilted with respect to the x-ray image plane. Thus, aliasing is eliminated because x-ray photons are absorbed by the angled scintillating cores at various depths, so that they could easily cross the fiber cladding and be absorbed in the neighboring scintillating fiber core. In this manner, the image plane will no longer be composed of well defined discrete pixels and some blurring is introduced that may be later reduced by edge enhancement image processing. Moreover, the transmission of x-rays to the light image detector through the fiber cladding is eliminated since there will be no direct path for x-ray photons through the cladding.

DETAILED DESCRIPTION OF THE DRAWINGS

DESCRIPTION OF THE PREFERRED EMBODIMENTS

Figure 1:
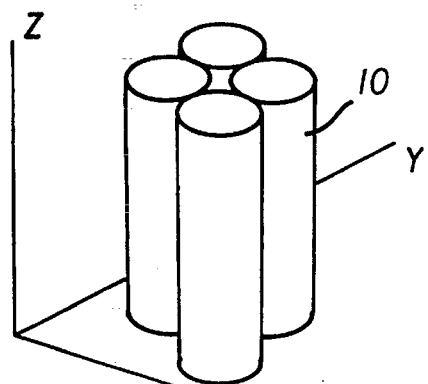
FIG. 1 is a diagrammatic view of a known fiber optic array.
Figure 2:
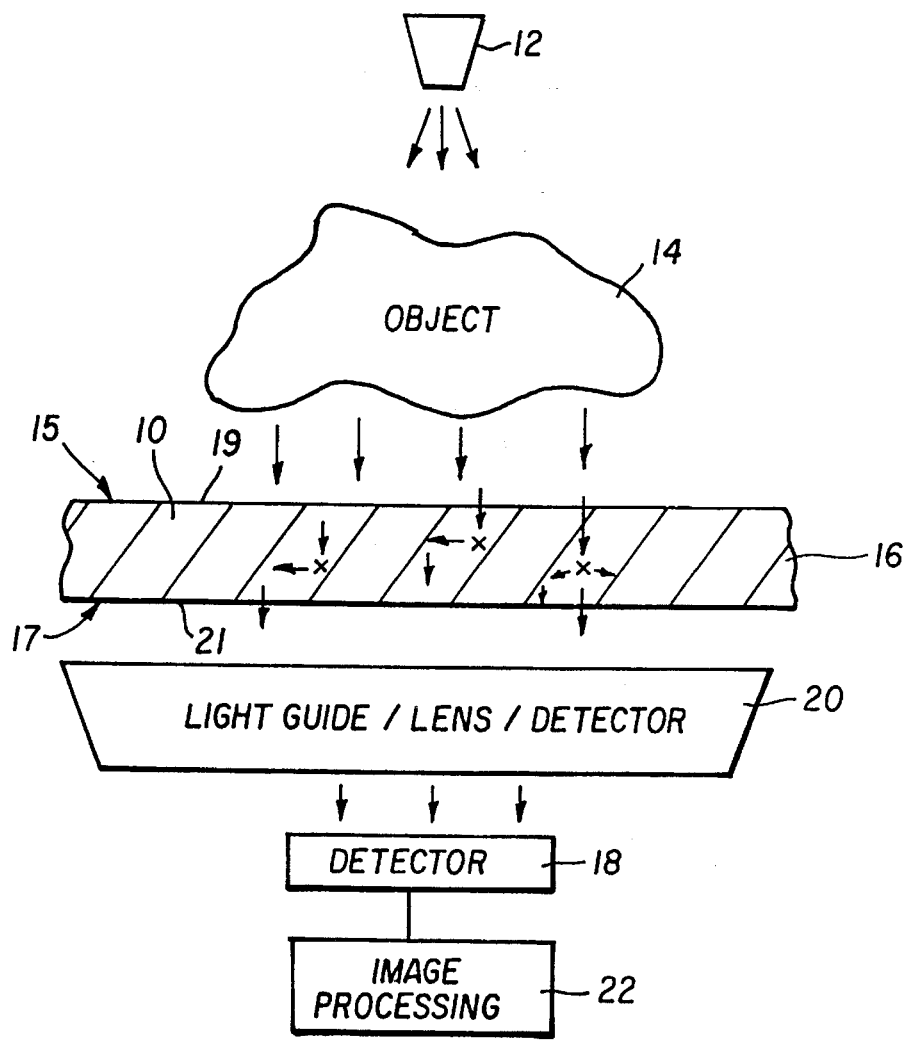
FIG. 2 is a diagrammatic view of an x-ray imaging system incorporating an embodiment of the present invention.

Referring now to FIG. 2, there is shown an x-ray imaging system incorporating an embodiment of the present invention. As shown, an x-ray source 12 emits x-rays which are passed through object 14 (such as a body part). An x-ray image of the object is projected on to a first face 15 of fiber optic scintillating plate 16 which converts the x-ray image into a corresponding light image which is emitted from second face 17 of plate 16. The light image is converted to an x-ray image signal by detector 18 (such as a CCD sensor, a TFT array) after transmission by optical assembly 20 (such as a light guide or lens assembly).

The x-ray image signal is digitized and processed by image processing circuit 22 for image characteristics, such as tone scale, edge enhancement, segmentation.

Fiber optic scintillating plate 16 is made of monolithic bundles of round or hexagonally shaped glass or plastic rods 10. The rods 10 have first ends 19 coextensive with plate face 15 and second ends 21 coextensive with plate face 17. The rods have a core which is doped with some type of material (e.g., a rare earth element such as terbium) which emits visible light when exposed to x-rays. Each rod is clad to minimize cross-talk between rods. The visible light produced in each rod as a result of x-ray absorption is channeled and directed toward the detector 18.

Figure 3:
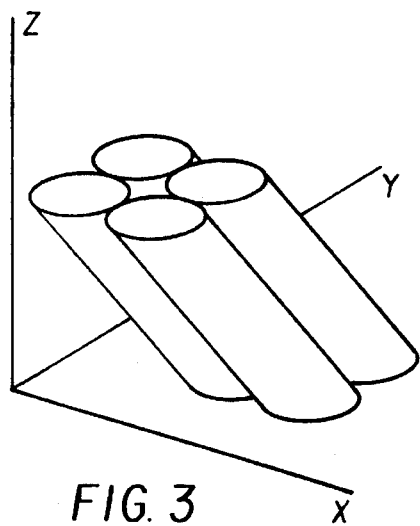
FIGS. 3–6 are diagrammatic views of an embodiment of the present invention.
Figure 4:
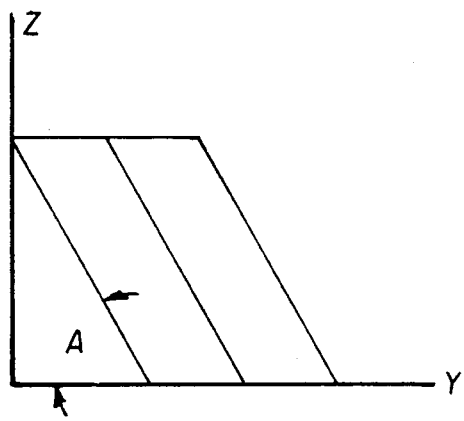
Figure 5:
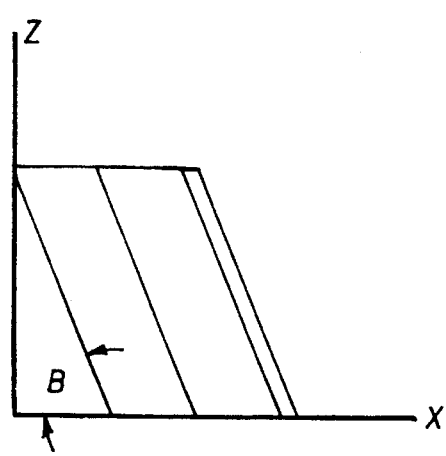
Figure 6:
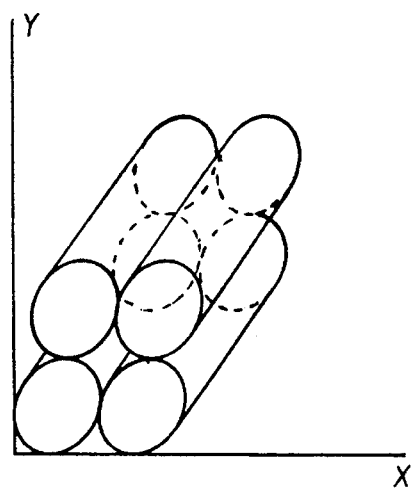

According to the present invention, the rods 10 are tilted with respect to the image plane (FIG. 3). The first angle A, may be on the Y-Z plane (FIG. 4) and the second angle B could be on the X-Z plane (FIG. 5), or with respect to the row, column, or any direct axis of the formation of fibers. Rods 10 are angled so that no x-ray photon will have a direct path through a single fiber core or cladding (FIG. 6). The optimum angles A and B will depend on the pixel pitch, pixel spacing, the thickness of the plate 16, and the x-ray absorption of the material used in construction of the plate 16. These angles could have a range of 1 to 89 degrees and are optimized for best performance of the plate 16.

Alternatively, a fiber optic scintillating plate with normal angle rods may be used and the whole plate may be tilted to obtain the same effective angles and purpose. Also the x-ray to light conversion does not necessarily have to happen within the fiber optic plate and this conversion may be done beforehand by placing a common scintillating plate on the surface of the fiber optic plate.

Such a scintillating plate may be used in various medical x-ray imaging modalities (FIG. 2). The resulting visible image can then be imaged by a CCD via a lens or fiber optic guide or alternatively it can be imaged directly by some other light detector such as a large area CCD or a two dimensional array of photo diodes and thin-film transistors.

Advantages and Industrial Applicability

The invention finds applicability in x-ray imaging systems used in medical, industrial and scientific applications. A fiber optic scintillating plate, according to the invention, eliminates aliasing and x-ray penetration. The aliasing will be eliminated since the x-ray photons are absorbed at various depths, they could easily cross the cladding and be absorbed at the neighboring fiber core. In this manner, the image plane will no longer be composed of well-defined discrete pixels and some blurring is introduced that may be later reduced by edge enhancement algorithms. With the same token, the transmission of x-rays to the detector through the cladding is eliminated since there will be no direct path for those photons through the cladding.

The invention has been described in detail herein with reference to the figures, however, it will be appreciated that variations and modifications are possible within the spirit and scope of the invention.

What is claimed is:

1. X-ray imaging apparatus comprising:

an x-ray scintillating plate having a first face upon which is projected an x-ray image;

a bundle of fiber optic rods having first and second ends, wherein said first ends are coupled with said first face of said plate, each of said fiber optic rods including a core of optical material which emits light when exposed to x-rays and cladding surrounding said core; and a second face coupled to said second ends of said rods for emitting a light x-ray image produced by said bundle of fiber optic rods in response to a projected x-ray image;

wherein said bundle of fiber optic rods are oriented at such an angle other than 90° relative to an x-ray image projected thereon, that substantially all x-rays of said x-ray image are absorbed by said rod cores before they are transmitted to said second face.

2. The x-ray imaging apparatus of claim 1 including a photodetector for converting said light x-ray image into an x-ray image signal.

3. The x-ray imaging apparatus of claim 1 wherein said first face of said scintillating plate is parallel to the plane of said x-ray image which extends in X and Y mutually perpendicular directions, and wherein said fiber optic rods are oriented at an angle, other than normal, with respect to both said X direction and said Y direction of said plane of said x-ray image.

* * * * *